United States Patent
Führer

(10) Patent No.: US 7,908,914 B2
(45) Date of Patent: Mar. 22, 2011

(54) DETERMINATION OF THE ROTATIONAL SPEED OF A TRANSMISSION SHAFT

(75) Inventor: Kim Führer, Lindau (DE)

(73) Assignee: ZF Friedrichshafen AG, Friedrichshafen (DE)

(*) Notice: Subject to any disclaimer, the term of this patent is extended or adjusted under 35 U.S.C. 154(b) by 145 days.

(21) Appl. No.: 12/301,363

(22) PCT Filed: Apr. 25, 2007

(86) PCT No.: PCT/EP2007/054019
§ 371 (c)(1),
(2), (4) Date: Nov. 18, 2008

(87) PCT Pub. No.: WO2007/134935
PCT Pub. Date: Nov. 29, 2007

(65) Prior Publication Data
US 2009/0183566 A1      Jul. 23, 2009

(30) Foreign Application Priority Data
May 19, 2006   (DE) .......................... 10 2006 023 554

(51) Int. Cl.
*G01M 15/00* (2006.01)
*G01P 3/00* (2006.01)
(52) U.S. Cl. ...................................... 73/115.02; 73/494
(58) Field of Classification Search ............... 73/115.02, 73/494
See application file for complete search history.

(56) References Cited

U.S. PATENT DOCUMENTS

| | | | |
|---|---|---|---|
| 4,033,200 A * | 7/1977 | Stockton | 475/206 |
| 4,320,381 A | 3/1982 | Olivier | |
| 4,799,399 A * | 1/1989 | Bruce | 74/473.21 |
| 4,817,470 A | 4/1989 | Müller et al. | |
| 4,901,562 A | 2/1990 | Beakas et al. | |
| 5,335,764 A | 8/1994 | Leitner et al. | |
| 5,825,176 A * | 10/1998 | Babin et al. | 324/174 |
| 5,928,109 A * | 7/1999 | Allen et al. | 477/111 |
| 6,182,518 B1 | 2/2001 | Baur | |
| 6,374,688 B1 * | 4/2002 | Bockmann et al. | 74/336 R |
| 6,422,105 B1 | 7/2002 | Rose | |
| 6,619,450 B2 * | 9/2003 | Ota et al. | 192/3.56 |
| 6,679,133 B1 * | 1/2004 | Kayano et al. | 74/335 |
| 2003/0052562 A1 | 3/2003 | Antony et al. | |
| 2005/0126321 A1 * | 6/2005 | Ochi et al. | 74/335 |
| 2006/0225520 A1 | 10/2006 | Heinzelmann | |
| 2007/0209902 A1 * | 9/2007 | Muetzel et al. | 192/216 |
| 2009/0188336 A1 * | 7/2009 | Fuhrer | 74/331 |
| 2009/0280948 A1 * | 11/2009 | Fuhrer et al. | 475/331 |

(Continued)

FOREIGN PATENT DOCUMENTS

DE          1 911 488       2/1970

(Continued)

*Primary Examiner* — Freddie Kirkland, III
(74) *Attorney, Agent, or Firm* — Davis & Bujold, P.L.L.C.

(57) ABSTRACT

An arrangement for determining the rotational speed of a transmission shaft (3) featuring a transmission shaft (3), a rotational speed transmitter that is connected in a rotationally fixed manner with the transmission shaft (3) and a stationary rotational, speed sensor (34), via a rotational speed that can be detected from the rotational speed transmitter. The rotational speed transmitter is provided on the periphery of a shift collar (20) of a coupling device (19) that is axially displaceable and arranged in a rotationally fixed manner on the transmission shaft. The invention also relates to a transmission with an arrangement of this kind, as well as to a method of determining the rotational speed of the transmission shaft.

18 Claims, 3 Drawing Sheets

U.S. PATENT DOCUMENTS

2010/0176797 A1 * 7/2010 Fuhrer .......................... 324/160

FOREIGN PATENT DOCUMENTS

| | | |
|---|---|---|
| DE | 40 08 878 A1 | 10/1990 |
| DE | 41 13 128 A1 | 10/1992 |
| DE | 43 33 512 A1 | 4/1994 |
| DE | 197 03 488 A1 | 8/1998 |
| DE | 198 14 758 A1 | 10/1999 |
| DE | 101 45 947 C1 | 11/2002 |
| DE | 102 23 625 A1 | 12/2003 |
| DE | 103 47 494 A1 | 6/2005 |
| EP | 0 443 939 A1 | 8/1991 |
| GB | 1 241 095 | 7/1991 |
| JP | 2002-181142 | 6/2002 |
| WO | WO-2005/038421 A | 4/2005 |

* cited by examiner

DETERMINATION OF THE ROTATIONAL SPEED OF A TRANSMISSION SHAFT

This application is a national stage completion of PCT/EP2007/054019 filed Apr. 25, 2007, which claims priority from German Application Serial No. 10 2006 023 554.1 filed May 19, 2006.

FIELD OF THE INVENTION

The invention relates to an arrangement for determining the rotational speed of a transmission shaft. The arrangement includes a transmission shaft, a rotational speed transmitter that is rotationally fixed to the transmission shaft and a stationary rotational speed sensor, such that the rotational speed can be detected from the rotational speed transmitter. Furthermore, the present invention relates to a transmission with such an arrangement and a method for determining the rotational speed of a transmission shaft.

BACKGROUND OF THE INVENTION

Various arrangements for determining the rotational speed of a transmission shaft are known from the state of the art. Also known as rotational speed detection devices, these arrangements for generating a speed signal for a motor vehicle or the like essentially comprise a signal or rotational speed transmitter rotationally fixed to the corresponding transmission shaft. A stationary rotational speed sensor is associated with the rotational speed transmitter in order to detect the rotational speed of the rotational speed transmitter.

In general, this is the way in which DE 198 14 758 A1 describes a device for detecting the rotational speed of a shaft. The known device features a signal transmitter that is rotationally fixed to the shaft. The signal transmitter is configured like a gear wheel, where the teeth of the gear wheel each feature a steep and a flat tooth flank. In addition, an analog Hall effect sensor is provided that detects the rotational speed in a radial direction on the periphery of the gear wheel, i.e., on the teeth. Thanks to the different angles of the two flanks of each tooth, it is possible to determine the rotational speed and the direction of rotation of the shaft with only one sensor and at a constantly updating rate, even when the shaft is rotating at a very low rotational speed.

DE 103 47 494 A1 describes a similar arrangement that is supposed to determine the torque of transmission shafts. For this purpose, the known device is comprised of a transmission shaft on which a rotational speed transmitter gear wheel is rotationally fixed, where a stationary rotational speed sensor is once again associated with the rotational speed transmitter gear wheel. The teeth of the rotational speed transmitter gear wheel, as they rotate past the rotational speed sensor, produce electric impulses, which are fed to a corresponding evaluation unit.

The state of the art shown above has proved its value in practice, but the additional signal transmitter, rotational speed transmitter or rotational speed transmitter gear wheels result in an increase in the total length of the transmission and to an increase in weight, which can be a disadvantage with certain arrangements of the transmission inside the motor vehicle.

In comparison, DE 102 23 625 A1 proposes a rotational speed detection device for a transmission of a motor vehicle that likewise comprises a signal transmitter and a sensor, where the signal transmitter is integrated in a dust-proof cover for an output-side, shaft-sealing ring. The dust-proof cover is arranged outside the transmission housing and is connected in a rotationally fixed manner to the housing. This solution is an advantage in so far as the existing dust-proof cover functions at the same time as a signal transmitter, which means that the weight of the transmission is not increased by an additional component. Nevertheless, the externally situated sensor leads to an enlargement of the transmission, which makes installation in a motor vehicle more difficult. Furthermore, it is necessary to accordingly modify the cover to protect against dust so that it can function as a signal transmitter. It is proposed that equidistant size increases be provided on the periphery of the dust cover which, not only further increase the size of the transmission, but which also result in greater fabrication expense.

It is the object of the invention to devise an arrangement for detecting the rotational speed of a transmission shaft that overcomes the disadvantages cited above. Furthermore, it is an object of the invention to devise a transmission for a motor vehicle with such an advantageous arrangement and, in addition to that, it is the object of the invention to disclose an improved method of detecting the rotational speed of a transmission shaft.

SUMMARY OF THE INVENTION

According to the invention, the arrangement for detecting the rotational speed of a transmission shaft features a transmission shaft. This can be the input shaft, a countershaft, the main shaft or the output shaft of a transmission, for example. A rotational speed transmitter is rotationally fixed to the transmission shaft. Furthermore, a stationary rotational speed sensor is provided by which means the rotational speed at the rotational speed transmitter can be detected. The rotational speed transmitter is provided on the periphery of the shift collar, which can also involve integration of the rotational speed transmitter to the shift collar. The shift collar is arranged in an axially movable and rotationally fixed manner on the transmission shaft and is part of a coupling device. The coupling device could be a claw coupling which, among other things, encompasses the cited shift collar. In addition, the coupling device can also contain a synchronization device. The coupling device can serve to couple the transmission shaft to a free wheel on the transmission shaft or to another transmission shaft.

The rotational speed transmitter is therefore based on the existing shift collar of the coupling device, such that—in a manner similar to that of the rotational speed detection device known from DE 102 23 625 A1—an existing transmission component functions partially as a rotational speed transmitter. In this respect, a complete rotational speed transmitter gear wheel is not necessary so that a reduction in weight is achieved as well as a reduction in the length of the transmission. Compared to the state of the art according to DE 102 23 625 A1, the advantage is also achieved that the space in the interior of the transmission can be used that would be available in any case in the area of the periphery of the switching for the arrangement of the rotational speed sensor. In that way, the transmission is not enlarged as it is when the sensor for the dust-proof cover is arranged on the outside of the transmission housing. In addition, in the case of a transmission with the inventive arrangement, a dust-proof cover for the shaft-sealing ring can be dispensed with, particularly as this is not needed for determining the rotational speed of the transmission shaft.

In a preferred embodiment of the inventive arrangement, the rotational speed sensor is aligned in such a way that the rotational speed can be determined in the radial direction on the rotational speed transmitter on the periphery of the shift collar. The rotational speed sensor can be a Hall effect sensor or an induction sensor. Detection in a radial direction, which can be achieved through a lateral, radial arrangement of the rotational speed sensor, is more reasonable than the shift collar being displaceable in an axial direction, which would lead, with detection in an axial direction, to a collision of the shift collar with the rotational speed sensor.

In a particularly preferred embodiment of the inventive arrangement, the shift collar features external teeth that can be made to mesh with internal teeth of a transmission part that is to be coupled. The transmission component to be coupled can be a free wheel on the transmission shaft or another transmission shaft. The rotational speed transmitter in this embodiment is formed by the external teeth of the shift collar. In this way, the external teeth, which are necessary for coupling with another transmission part, can be used in an unchanged form as a rotational speed transmitter, i.e., a special adaptation of the shift collar that is necessary in the known dust-proof cover (DE 102 23 625 A1), is not required. Hence the design of the arrangement is simplified and the production expenditure is reduced.

In an additional advantageous embodiment of the inventive arrangement, the shift collar can be displaced from a neutral position into a first coupling position in which the external teeth mesh with the internal teeth of a first transmission part that is to be coupled, such as a first free wheel on the transmission shaft or another transmission shaft.

According to an additional advantageous embodiment of the inventive arrangement, the shift collar can also be displaced from the neutral position in the opposite direction into a second coupling position in which the external teeth mesh with the inner teeth of a second transmission part that is to be coupled. The opposite direction is to be understood as the direction opposite to the direction in which the coupling sleeve is displaced into the first coupling position.

In order to guarantee that the arrangement can permanently determine the rotational speed of the transmission shaft, the rotational speed transmitter is arranged in such a way in a preferred embodiment of the inventive arrangement that the rotational speed in the neutral position in the first coupling position, and in the second coupling position can be detected from the external teeth. The rotational speed sensor can therefore be arranged in such a way that it detects the rotational speed in the neutral position of the shift collar in a middle area of the external teeth, while it detects the rotational speed in the two coupling positions respectively in an outer area of the external teeth. In each instance, it is guaranteed that detection from the external teeth can take place in all predetermined positions into which the shift collar is displaced.

In an additional advantageous embodiment of the inventive arrangement, a shift fork is provided for displacing the shift collar.

When the shift fork is used, in order to guarantee that assured displacement of the shift collar and permanent detection of the rotational speed will be possible from the external teeth, in a preferred embodiment of the inventive arrangement, a peripheral groove is provided in the shift collar with which the shift fork is engaged. The external teeth thereby feature two lateral external tooth sections between which the peripheral groove extends. The rotational speed can then be detected in the neutral position and in the first coupling position of the shift collar from one of these external teeth sections, while the rotational speed in the second coupling position of the shift collar can be detected from the other external teeth section. In order to achieve this, the dimensions and arrangements of the rotational speed sensor, the external teeth sections and the peripheral groove must be accordingly matched with each other. Thus the rotational speed cannot be detected when the rotational speed sensor is situated above the peripheral groove, however, it is guaranteed that in the predefined neutral and coupling positions of the shift collar, the rotational speed can be detected from the respective external teeth sections.

In an additional advantageous embodiment of the inventive arrangement, the rotational speed sensor is attached to the end of a sensor arm, which extends to the shift collar or the rotational speed transmitter of the shift collar.

In order to reasonably exploit the space inside a transmission housing, in an additional advantageous form of the inventive arrangement, the sensor arm is attached in a transmission housing and extends through the actuator space. The actuator space is understood here as the space inside the transmission housing in which the actuating elements of the gearshift assembly are located, such as the rails of a continuously variable transmission.

According to an additional preferred embodiment of the inventive arrangement, a sensor-side section of the sensor arm, i.e., the section of the sensor arm that receives the rotational speed sensor, is configured in such a way that in the neutral position, the first coupling position and/or the second coupling position, the section extends into or through the shift fork opening. The shift fork opening is understood here as the opening that remains between the two braces of the shift fork and the encompassed shift collar.

In another preferred embodiment of the inventive arrangement, the section of the sensor arm section on the sensor side is arranged opposite the shift fork opening and displaced in the direction of the shift fork opening. Lateral displacement is understood as lateral displacement with respect to a section of the sensor arm on the attachment side. In this embodiment, the sensor-side section can plunge into the shift fork opening during displacement of the shift fork, while the shift fork does not collide with the attachment-side section.

In order to also efficiently use the space that is occupied by the sensor arm inside a transmission housing, in another advantageous embodiment of the inventive arrangement, a free wheel is provided on the transmission shaft such that the free wheel can engage the transmission shaft via the coupling device, where a gearset rotational speed sensor is provided on the sensor arm, by means of which the rotational speed of the free wheel can be detected from the teeth of same. The sensor arm thus serves to accept an additional measuring element for which no additional holder is necessary.

In an additional advantageous embodiment of the inventive arrangement, the transmission part to be coupled is a free wheel on the transmission shaft or a stationary gear wheel on another transmission shaft. In the latter case, this could be the input shaft of the transmission where the direct gear is engaged by way of the clutch.

The inventive transmission for a motor vehicle features the inventive arrangement for determining the rotational speed of a transmission shaft.

In a preferred embodiment of the inventive transmission, the transmission shaft is the main shaft of the transmission, where an additional two countershafts are provided, between which the main shaft is mounted in a floating manner.

The inventive method of determining the rotational speed of a transmission shaft consists of the methodological steps of providing a transmission with a transmission shaft and a coupling device that features an axially displaceable shift collar that is connected in a rotationally fixed manner to the transmission shaft and the registration of the rotational speed on the periphery of the shift collar. In this case, the transmission is preferably a transmission of the previously cited type.

BRIEF DESCRIPTION OF THE DRAWINGS

The invention will now be described, by way of example, with reference to the accompanying drawings in which.

DETAILED DESCRIPTION OF THE INVENTION

Figure 1:
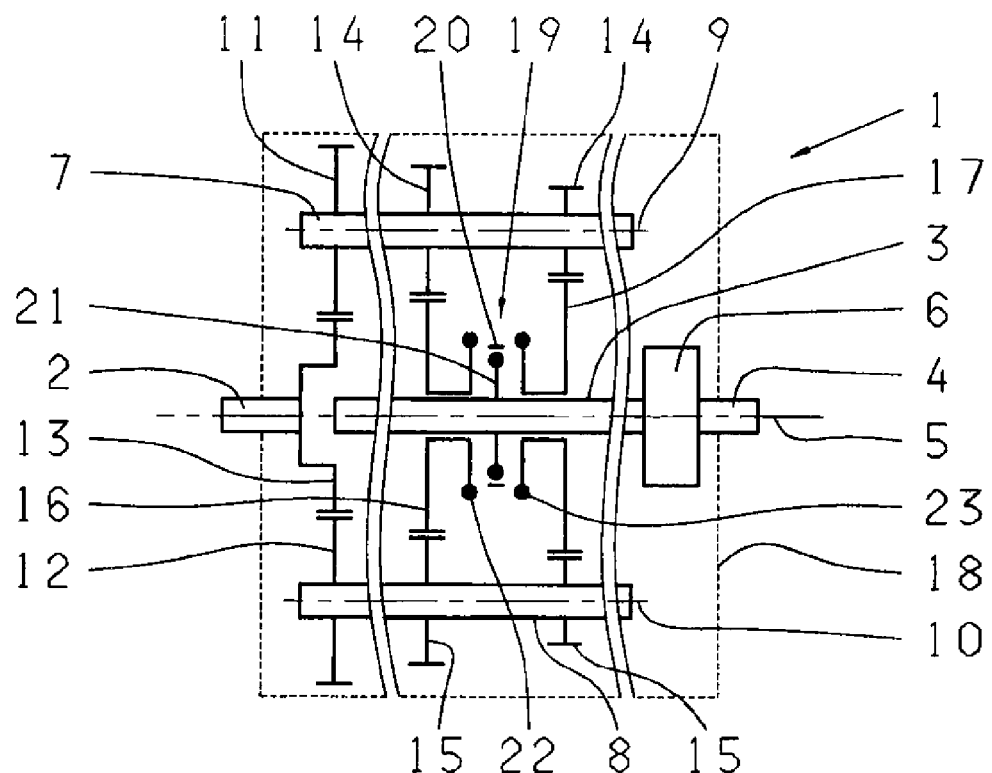
FIG. 1 is a schematic representation of a transmission with the inventive arrangement for determining the rotational speed of a transmission shaft.

FIG. 1 shows a schematic representation of a transmission I for a motor vehicle, where the transmission features an arrangement for determining the rotational speed of a transmission shaft. The transmission 1 is a co-axial transmission with an input shaft 2, a main shaft 3 and an output shaft 4 that are arranged end to end along on an axis 5. The main shaft 3 is connected via an only schematically implied planetary gearset 6 with the output shaft 4. In addition, two countershafts 7, 8 are provided, which extend parallel to the input shaft 2, the main shaft 3 and the output shaft 4 along two axes 9, 10. There is a pinion gear 11, 12 affixed to each of the countershafts 7, 8. These gears mesh with an output gear wheel 13 of the drive shaft 2 so that the countershafts 7, 8 can be driven by the driveshaft 2. Furthermore, additional fixed gearwheels 14, 15 are provided on the countershafts 7, 8. These gear wheels mesh with free wheels 16, 17 on the main shaft 3. The main shaft 3 is mounted in a floating manner between the two countershafts 7, 8 with sufficient play between the input shaft 2 and the output shaft 4. The transmission 1 also features a transmission housing 18, through which the ends of the input and output shafts 2, 4 opposite the main shaft 4 extend outwards.

In order to be able to establish a rotationally fixed connection or a coupling of the main shaft 3 with one of the free wheels 16, 17, a coupling device 19 is provided on the main shaft. The coupling device 19 features a shift collar 20 that can be axially displaced and is arranged in a rotationally fixed manner by way of a sleeve carrier 21 on the main shaft 3. In the sides of the free wheels 16, 17, facing the shift collar 20, there are also recesses provided into which the shift collar 20 can be displaced where, inside the recesses, internal teeth 22, 23 are provided, whose function will be described below.

Figure 2:
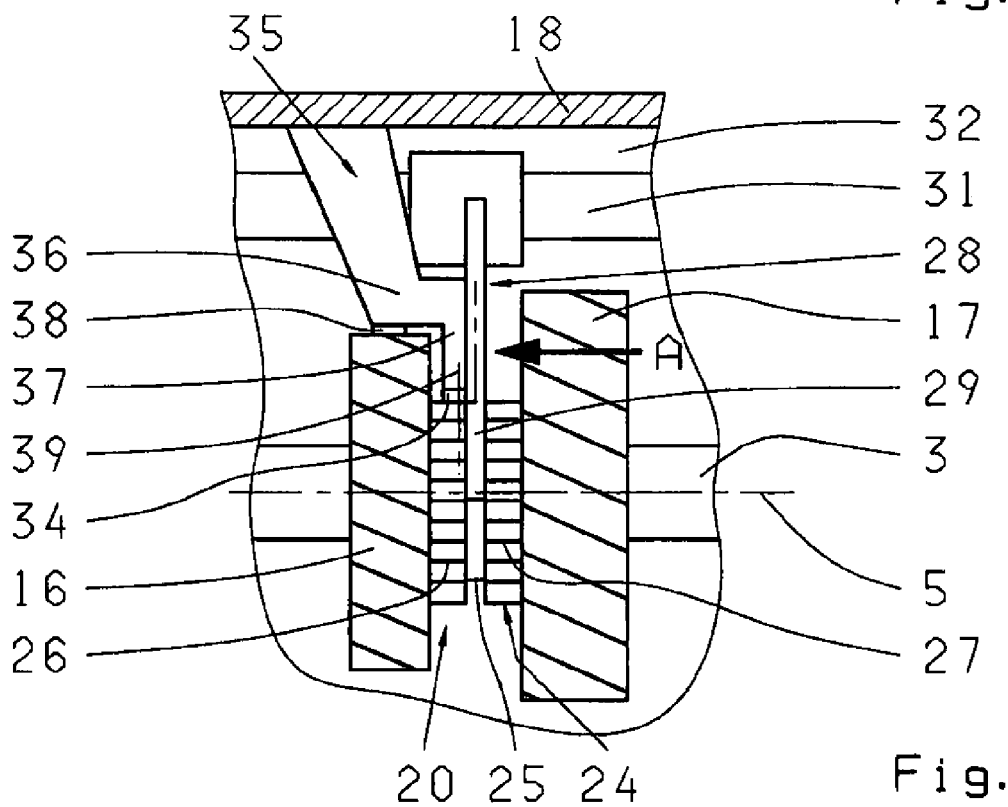
FIG. 2 is a partial lateral view of the arrangement in FIG. 1 with the shift collar in the neutral position.
Figure 3:
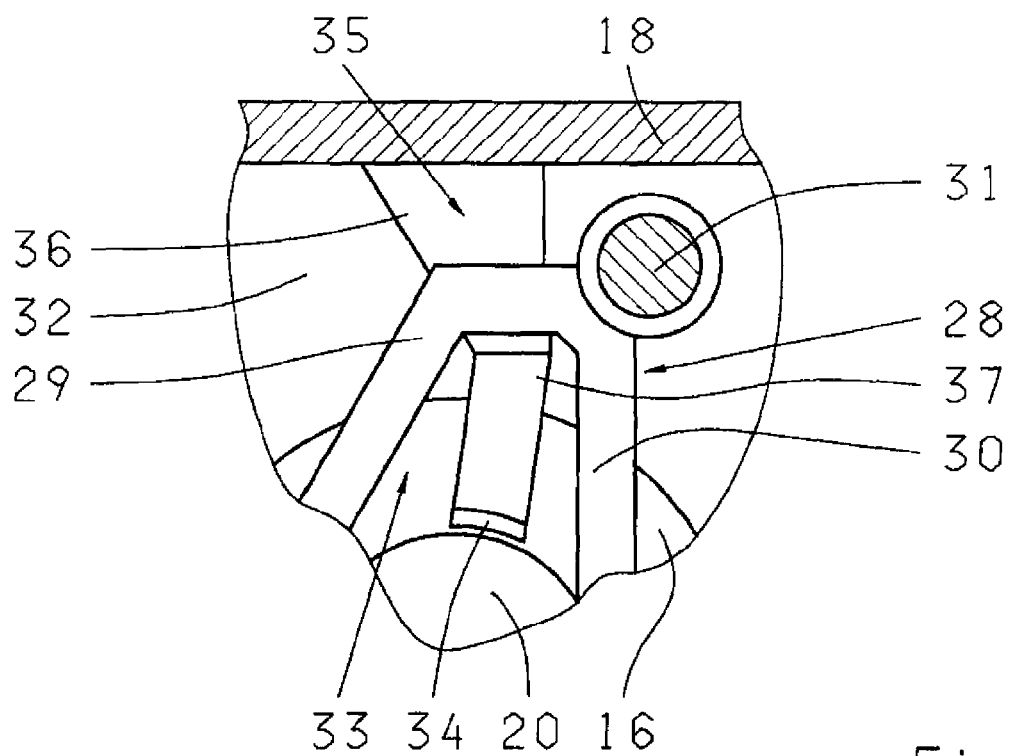
FIG. 3 is a view of the arrangement in FIG. 2 in the direction of the arrow A.

The rest of the design of the arrangement will be described below with reference to FIGS. 2 to 5. FIG. 2 shows a partial lateral view of the arrangement. The shift collar 20 features external teeth 24 that are configured as straight teeth. In addition, an intermediate peripheral groove 25 is provided in the shift collar 20 that divides the external teeth 24 into two lateral external teeth sections 26, 27. In order to axially displace the shift collar 20, a shift fork 28 is provided, which can be seen in FIG. 3 in a front view. The shift fork 28 consists of two braces 29, 30, which laterally engage the peripheral groove 25 in the shift collar and are merged in order to be attached together to a rail 31 of a continuously variable transmission. The rail 31 extends parallel to the main shaft 3 through an actuator space 32 inside the transmission housing 18, which extends above the main shaft 3 and the free wheels 16, 17. The shift fork 28 is configured to be long enough that a shift fork opening 33 remains between the braces 29, 30 and the adjacent shift collar 20, as can be seen in FIG. 3.

The arrangement also comprises a rotational speed sensor 34 that is arranged in a stationary manner close to the periphery of the shift collar 20 and the external teeth 24 of the shift collar 20. The rotational speed sensor 34 is attached to the end of a sensor arm 35. The sensor arm 35 comprises an attachment section 36 that is attached to the transmission housing 18 and extends through the actuator space 32. The attachment section 36 extends initially in an essentially radial direction, and then assumes a course that is aligned essentially parallel to the main shaft 3. A sensor-side section 37 is connected to the attachment section 36. The sensor-side section extends, in turn, in a radial direction toward the shift collar 20 and retains the rotational speed sensor 34 at its end. Due to the placement and design of the attachment section 36, the sensor-side section 37, which is opposite the shift fork opening 33 (FIG. 3), is deposed, in an offset manner, in the direction of the switch fork opening 33.

On the sensor arm 35, a gearset rotational speed sensor 38 is attached to the part of the attachment section 36 that is aligned parallel with the main shaft 3, so that to be arranged close to the periphery of the free wheel 16 facing the teeth of the free wheel 16. Using this gearset rotational speed sensor 38, the rotational speed of the free wheel 16 can also be detected from the teeth of same.

The arrangement also features a rotational speed transmitter that is arranged on the periphery of the shift collar 20. The rotational speed transmitter is formed by the external teeth 24 facing the rotational speed sensor 34 or by the external teeth sections 26, 27 of the shift collar 20. The rotational speed sensor 34, which in the present example is a Hall effect sensor or an induction sensor, detects the rotational speed in a radial direction from the external teeth 24. This means that the teeth of the external teeth system 24 that rotate past the rotational speed sensor 34 produce impulses in the rotational speed sensor 34 that are relayed to an evaluation unit that is not shown. The latter can calculate the rotational speed of the main shaft 3 from the number of impulses per unit of time. The registration of the rotational speed in a radial direction is particularly advantageous in the present transmission 1, because in it, the radial play of the main shaft 3 is smaller than the axial play of same so that the range of tolerance of the rotational speed sensor 34, within which rotational speed determination can be reliably performed, is greater than the radial play.

The characteristics of the embodiment of the arrangement and its mode of operation will be described below with reference to FIGS. 2 to 5.

In FIG. 2, the shift collar 20 is in an intermediate neutral position, in which the external teeth 24 of the shift collar 20 do not engage the internal teeth 22, 23 of the adjacent free wheels 16, 17, i.e., neither of the free wheels 16, 17 is coupled in a rotationally fixed manner with the main shaft 3. The rotational speed sensor 34 can detect the rotational speed of the main shaft 3 from the external teeth section 26, specifically from an area of the external teeth section 26 that is close to the peripheral groove 25. In the neutral position, the sensor-side section 37 of the sensor arm is displaced partially into the shift fork opening 33 between the braces 29, 30. Thanks to the lateral displacement of the sensor-side section 37 relative to the attachment section 36, there is no collision between the shift fork 28 and the sensor arm 25.

Figure 4:
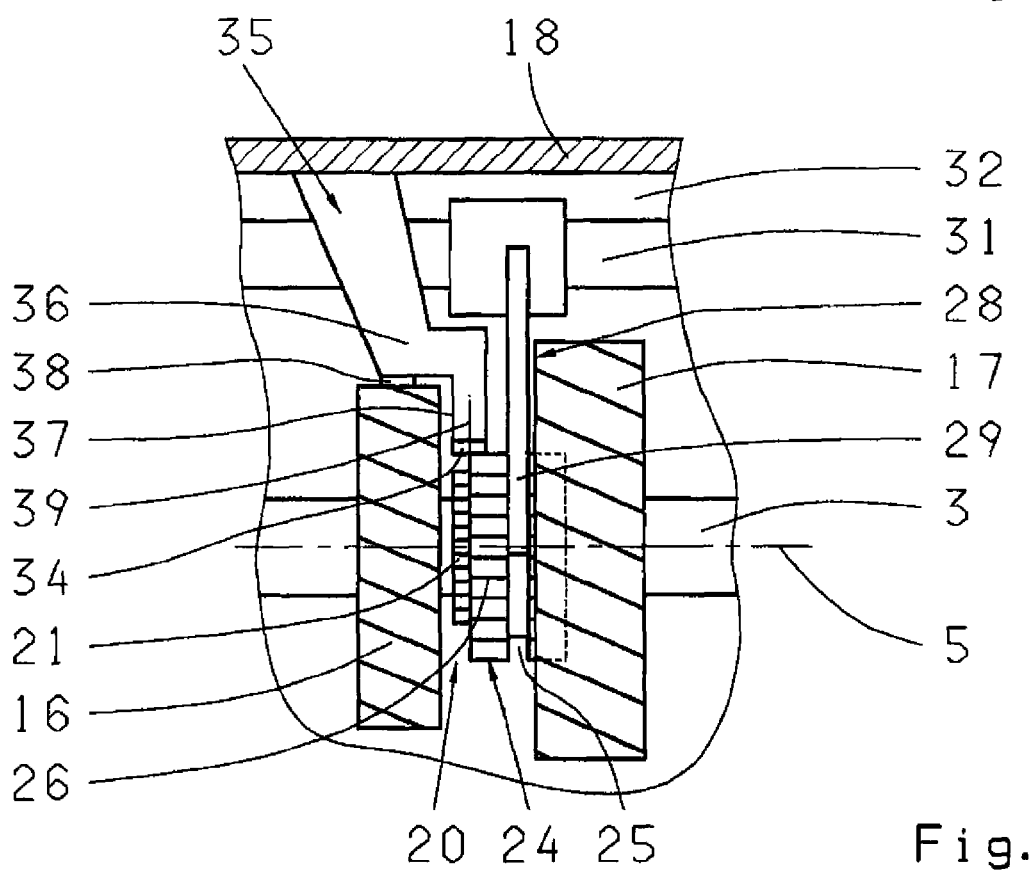
FIG. 4 is the arrangement in FIG. 2 with the shift collar in a first coupling position.

The shift collar 20 can now be axially displaced from the neutral position to a first coupling position, shown in FIG. 4, with the help of the continuously variable transmission and the shift fork 28. In this way, the shift collar 20 enters the lateral recess in the free wheel 17 and meshes with the internal teeth 23 of the free wheel 17. Hence the rotation of the input shaft 2 can be transferred to the main shaft 3 via the countershaft 7, 8, the fixed gear wheels 14, 15, the coupled free wheel 17 and the coupling device 19. In the first coupling position of the shift collar 20, the rotational speed sensor 34 continues to detect the rotational speed from the external teeth section 26, this time, however, in an area of the external teeth section 26 that is arranged at a distance from the peripheral groove 25, because the shift collar 20 has been displaced into the first coupling position to the right. In the first coupling position, the sensor-side section 37 of the sensor arm 35 no longer extends into the shift fork opening 33.

Figure 5:
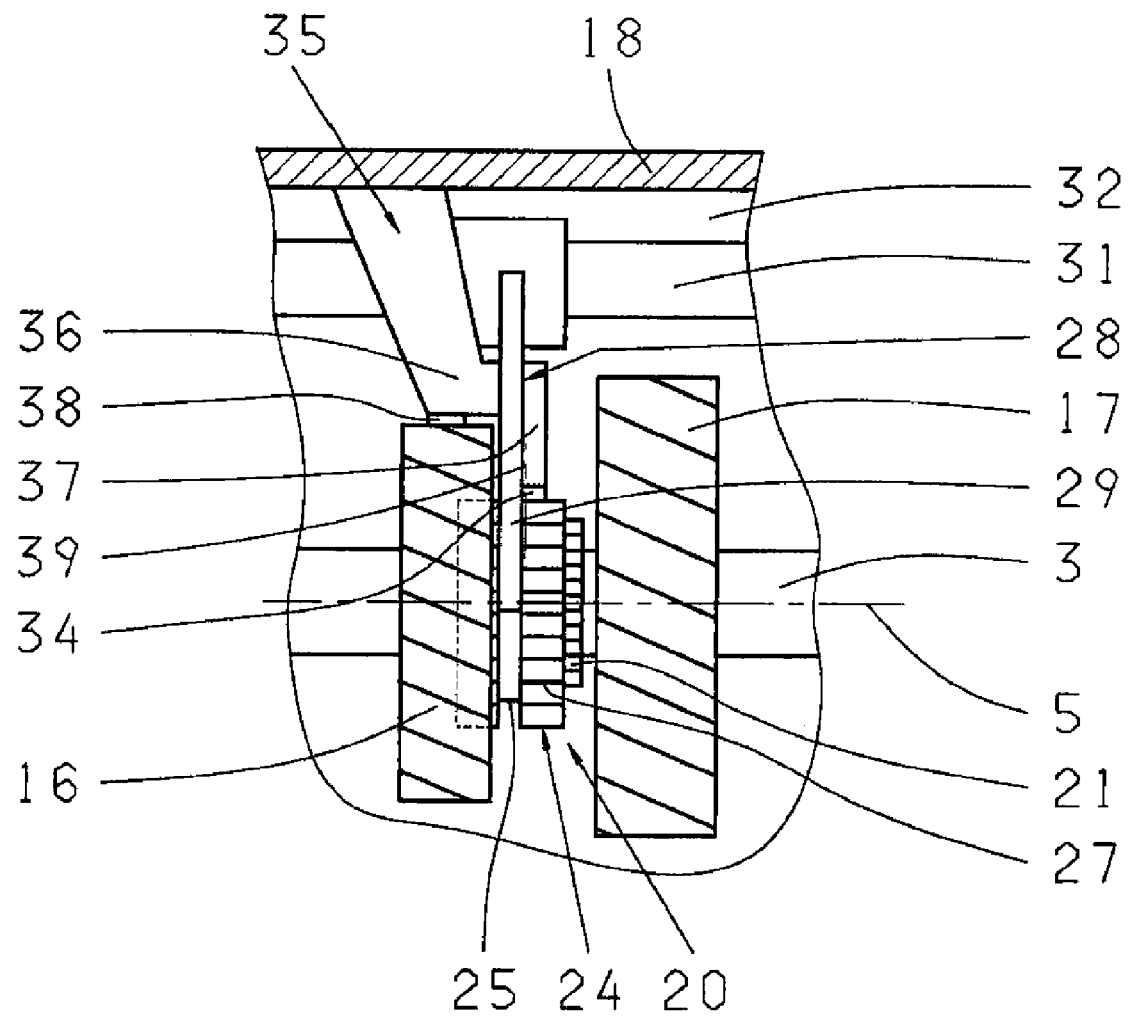
FIG. 5 is the arrangement in FIGS. 2 and 4 with the shift collar in a second coupling position.

In addition, the shift collar 20 can be axially displaced with the help of the continuously variable transmission and the shift fork 28 from the neutral position (FIG. 2) to a second coupling position, which is shown in FIG. 5. In this way, the shift collar 20 enters the lateral recess in the free wheel 16 and engages the internal teeth 22 of the free wheel 16. Hence the rotation of the input shaft 2 can be transferred via the countershafts 7, 8, the fixed gear wheels 14, 15, the engaged free wheel 16 and the coupling device 19 to the main shaft 3. In the second coupling position of the shift collar 20, the rotational speed sensor 34 now detects the rotational speed from the external teeth section 27, because the shift collar 20 is displaced to the left in the second coupling position. In the second coupling position, the sensor-side section 37 of the sensor arm 35 extends, in turn, through the shift fork opening 33, where it is again thanks to the lateral displacement of the sensor-side section 37 of the sensor arm 35 that no collision occurs between the shift fork 28 and sensor arm 35.

The embodiment of the rotational speed sensor 34, the width of the peripheral groove 25 and the width of the external teeth sections 26, 27 as a result are adapted to each other in such a way in the present example that the rotational speed in the neutral position (FIG. 2), the first coupling position (FIG. 4) and the second coupling position (FIG. 5) can always be detected by the rotational speed sensor 34 from the external teeth 24. In this case, it should preferably be ensured that the central axis of the rotational speed sensor 34, which is designated with the reference numeral 38 in the Figures, is aligned in each of the cited position with the external teeth 24.

REFERENCE NUMERALS 1 transmission
2 input shaft
3 main shaft
4 output shaft
5 axis
6 planetary gearset
7 countershaft
8 countershaft
9 axis
10 axis
11 pinion gear
12 pinion gear
13 output drive gear
14 fixed gear wheel
15 fixed gear wheel
16 free wheel
17 free wheel
18 transmission housing
19 coupling device
20 shift collar speed sensor
21 sleeve carrier
22 internal teeth
23 internal teeth
24 external teeth
25 peripheral groove
26 external teeth section
27 external teeth section
28 shift fork
29 brace
30 brace
31 rail
32 actuator space
33 shift fork opening
34 rotational speed sensor
35 sensor arm
36 attachment section
37 sensor-side section of the sensor arm
38 gearset rotational speed sensor
39 intermediate axis of the rotational speed sensor

The invention claimed is:

1. An arrangement for determining a rotational speed of a transmission shaft (3) comprising an axially displaceable shift collar (20) of a coupling device (19), the shift collar (20) is arranged in a rotationally fixed manner on the transmission shaft (3), a radially outer peripheral surface of the shift collar (20) comprises a rotational speed transmitter, and a stationary rotational speed sensor (34) which detects a rotational speed of the rotational speed transmitter directly from the rotational speed transmitter.

2. The arrangement according to claim 1, wherein the rotational speed sensor (34) is aligned such that the rotational speed of the rotational speed transmitter is detected in a radial direction.

3. The arrangement according to claim 1, wherein the radially outer periphery of the shift collar (20) has external teeth (24) that mesh with inner teeth (22, 23) of a transmission part (16, 17) that is to be coupled, and the rotational speed transmitter is formed by the external teeth (24).

4. The arrangement according to claim 3, wherein the shift collar (20) is displacable in one axial direction from a neutral position to a first coupling position, in which the external teeth (24) mesh with inner teeth (22, 23) of a first transmission part (16, 17) that is to be coupled.

5. The arrangement according to claim 4, wherein the shift collar (20) is displacable in an axially opposite direction from the neutral position to a second coupling position, in which the external teeth (24) mesh with inner teeth (23, 22) of a second transmission part (17, 16) that is to be coupled.

6. The arrangement according to claim 5, wherein the rotational speed sensor (34) is arranged such that, in each of the neutral position, the first coupling position and the second coupling position, the speed sensor (34) detects the rotational speed of the external teeth (24).

7. The arrangement according to claim 3, wherein a switch fork (28) axially displaces the shift collar (20).

8. The arrangement according to claim 7, wherein a peripheral groove (25) is provided in the shift collar (20), with which the switch fork (28) engages, the external teeth (24) comprise first and second external teeth sections (26, 27) which are axially spaced from each other by the peripheral groove (25), and the speed sensor (34) detects the rotational speed, in a neutral position and a first coupling position of the shift collar (20), of the first external teeth section (26, 27), and in a second coupling position of the shift collar (20), the rotational speed of the second external teeth section (27, 26) is detected by the speed sensor (34).

9. The arrangement according to claim 8, wherein the rotational speed sensor (34) is attached to a sensor arm (35) that extends toward the shift collar.

10. The arrangement according to claim 9, wherein the sensor arm (35) is attached to a transmission housing (18) and extends through an actuator space (32).

11. The arrangement according to claim 9, wherein a sensor-side section (37) of the sensor arm (35) is configured such that the sensor arm, in at least one of the neutral position, the first coupling position and the second coupling position of the shift collar (20), extends either into or through an opening (33) in the switch fork (28) without contact.

12. The arrangement according to claim 11, wherein the sensor-side section (37) of the sensor arm (35) is axially offset from a remainder (36) of the sensor arm (35) with the sensor-side section (37) axially extending from the remainder (36) of the sensor arm (35) toward the opening (33) in the switch fork (28).

13. The arrangement according to claim 9, wherein the transmission part (16, 17) that is to be coupled is a free wheel (16) and is provided on the transmission shaft (3), and is coupled via the coupling device (19) to the transmission shaft (3), and a gear set rotational speed sensor (38) is provided on the sensor arm (35), by which a rotational speed of the free wheel (16) is readable from teeth of the free wheel (16).

14. The arrangement according to claim 3, wherein the transmission part (16, 17) to be coupled is one of a free wheel on the transmission shaft (3) or a fixed gear wheel on another transmission shaft.

15. The arrangement according to claim 1, wherein the arrangement is located within a transmission housing (18) of a motor vehicle.

16. The arrangement according to claim 15, wherein the transmission shaft (3) is a main shaft of the transmission (1) which includes two countershafts (7, 8), and the main shaft is disposed between the two countershafts (7, 8) in a floating manner.

17. A method of determining a rotational speed of a transmission shaft comprising the steps of:
providing a transmission with a transmission shaft and a coupling device that includes an axially displaceable shift collar which is connected in a rotationally fixed manner to the transmission shaft, and
detecting the rotational speed of a radially outer periphery of the shift collar with an arrangement in which the radially outer periphery of the shift collar (20) comprises a rotational speed transmitter, and a stationary rotational speed sensor (34) which detects the rotational speed of the rotational speed transmitter.

18. An arrangement for determining the rotational speed of a transmission shaft (3), the arrangement including:
a shift collar (20) that engages the transmission shaft (3) in a rotationally fixed, axially slidable manner, and the shift collar (20) comprising a radially external surface with a first axial section of external teeth (26) and a second axial section of external teeth (27) with a peripheral groove (25) located therebetween;
a shift fork (28) engages the peripheral groove (25) of the shift collar (20) for axially sliding the shift collar (20) between a first engaged position, a second engaged position and a disengaged position, the shift fork (28) having an opening (33) that extends between the first section of external teeth (26) and the second section of external teeth (27), the shift collar (20) in the first engaged position engages and rotationally drives a first free wheel (16), the shift collar (20) in the second engaged position engages and rotationally drives a second free wheel (17) and the shift collar (20) in the disengaged position is disengaged from both the first and the second free wheels (16, 17); and
a sensor arm (35) having a projection with a rotational speed sensor (34) located at a remote end thereof, such that
the projection extends so as to be adjacent the shift collar (20) with the speed sensor (34) being substantially radially aligned with the first section of external teeth (26), when the shift collar (20) is in the first engaged position; and
the projection passes through the opening (33) in the shift fork (28) and extends so as to be adjacent the shift collar (20) with the speed sensor (34) being substantially radially aligned with the second section of external teeth (27), when the shift collar (20) is in the second engaged position, the speed sensor (34) detecting the rotational speed of the shift collar (20) in each of the first and the second engaged positions and the disengaged positions.

\* \* \* \* \*